United States Patent [19]

Yamanashi et al.

[11] Patent Number: 4,482,473
[45] Date of Patent: Nov. 13, 1984

[54] LIQUID CRYSTAL MIXTURE

[75] Inventors: Fumiaki Yamanashi; Yuzo Hayashi; Yoshiyuki Fujiwara, all of Iwaki, Japan

[73] Assignee: Alps Electric Co., Ltd., Japan

[21] Appl. No.: 431,178

[22] Filed: Sep. 30, 1982

[30] Foreign Application Priority Data

Oct. 30, 1981 [JP] Japan .................... 56-174134

[51] Int. Cl.³ .................... G02F 1/13; C09K 3/34
[52] U.S. Cl. .................... 252/299.1; 252/299.2; 252/299.4; 350/349
[58] Field of Search ........... 252/299.1, 299.2, 299.4; 350/349

[56] References Cited

U.S. PATENT DOCUMENTS

| | | | |
|---|---|---|---|
| 3,864,022 | 2/1975 | Moriyama et al. | 252/299.1 |
| 3,888,566 | 6/1975 | Toriyama et al. | 252/299.2 |
| 3,922,067 | 11/1975 | Murao et al. | 252/299.2 |
| 3,956,169 | 5/1976 | Nakano et al. | 252/299.2 |
| 3,966,631 | 6/1976 | Toriyama et al. | 252/299.2 |
| 4,003,633 | 1/1977 | Yamashita | 252/299.1 |
| 4,252,417 | 2/1981 | Scheffer et al. | 350/349 |
| 4,279,770 | 7/1981 | Ihukai et al. | 252/299.63 |
| 4,291,949 | 9/1981 | Wada et al. | 252/299.1 |
| 4,400,059 | 8/1983 | Nagae et al. | 252/299.1 |

FOREIGN PATENT DOCUMENTS

| | | | |
|---|---|---|---|
| 49-29291 | 3/1974 | Japan | 252/299.5 |
| 54-126059 | 9/1979 | Japan | 252/299.1 |
| 56-57873 | 5/1981 | Japan | 252/299.3 |
| 2037803 | 7/1980 | United Kingdom | 252/299.1 |
| 2045274 | 10/1980 | United Kingdom | 252/299.1 |
| 2061994 | 5/1981 | United Kingdom | 252/299.1 |
| 2062667 | 5/1981 | United Kingdom | 252/299.1 |
| 2071685 | 9/1981 | United Kingdom | 252/299.1 |
| 2074182 | 10/1981 | United Kingdom | 252/299.1 |

OTHER PUBLICATIONS

Gharadjedaghi, F., Mol. Cryst. Liq. Cryst., vol. 68, pp. 127–135, (1981).

*Primary Examiner*—Teddy S. Gron
*Attorney, Agent, or Firm*—Guy W. Shoup; Henry T. Burke

[57] ABSTRACT

A liquid crystal mixture comprising a nematic liquid crystal having negative dielectric anisotropy, an optically active substance such as cholesteric or chiral-nematic liquid crystal, a dichroic dye and an ionic substance characterized by use of a hexadecylpyridinium salt having the following structural formula as the ionic substance

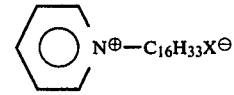

where X is a halogen atom.

3 Claims, No Drawings

LIQUID CRYSTAL MIXTURE

BACKGROUND OF THE INVENTION

This invention relates to a liquid crystal mixture containing an ionic substance which can be suitably used in the display mode utilizing the dynamic scattering effect in a positive type guest-host color liquid crystal display device.

The display system using the dynamic scattering mode (DSM) of a liquid crystal has been used in various display devices such as pocketable or desk-top calculators, timepieces, and so forth. The dynamic scattering mode of a liquid crystal refers to scattering of incident light that takes place as a result of local disturbance of the orientation of liquid crystal molecules due to the flow of ions inside a nematic liquid crystal with the application of an electric field to the nematic liquid crystal having negative dielectric anisotropy. Display can be effected by making use of this phenomenon.

There must be an electric charge in a liquid crystal to cause the dynamic scattering mode of the liquid crystal occurs. To this end, an ionic substance is generally added as a dopant to the nematic liquid crystal having negative dielectric anisotropy. However, with the application of an electric field, a conventional ionic substance is likely to cause a chemical reaction in a liquid crystal composition containing a dichroic dye added for the color liquid crystal display, an optically active substance and the like, and has low dissolution stability in the nematic liquid crystal having negative dielectric anisotropy. Hence, the resulting color liquid crystal display device has short service life and low reliability.

SUMMARY OF THE INVENTION

The present invention is designed to obviate these drawbacks of the prior art and is characterized by use of a hexadecylpyridinium salt represented by the following structural formula as the ionic substance which is added to the nematic liquid crystal having negative dielectric anisotropy:

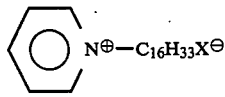

wherein X is a halogen atom. It has now been found that among the hexadecylpyridinium salts, those having Br as the halogen atom X provide the best result and that satisfactory results can be obtained if a liquid crystal substance consisting principally of a cyclohexanecarboxylate ester is used as the nematic liquid crystal having negative dielectric anisotropy.

DESCRIPTION OF THE PREFERRED EMBODIMENT

Hereinafter, the present invention will be explained in further detail with reference to examples thereof.

EXAMPLE

An indium oxide type transparent electrode was formed in a predetermined shape on a glass substrate. After a silane coupling agent was applied to cover the transparent electrode, vertical orientation treatment was effected to produce a liquid crystal cell substrate. Next, two liquid crystal cell substrates thus prepared were positioned facing each other with a 20 μm gap between them and were then pressbonded to each other to form a liquid crystal cell. Finally, a liquid crystal mixture having the composition illustrated below was charged into the cell and sealed to produce the liquid crystal display device.

| | |
|---|---|
| liquid crystal substance (consisting principally of a cyclohexanecarboxylate ester) (N-34; a product of Chisso Co.) | 99.2 wt % |
| optically active substance (cholesteryl nonanoate) | 0.26 wt % |
| dichroic dye | 0.5 wt % |

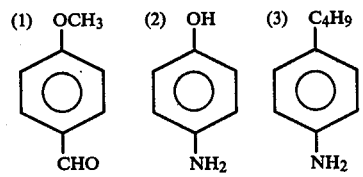

| | |
|---|---|
| ionic substance | 0.04 wt % |

The resulting color liquid crystal display device is in an extremely low coloring state without the application of an electric field and in an extremely high coloring state, or, has an extremely high display contrast, with the application of an electric field (32 Hz; square wave 10 V). The device could be actuated by a low voltage (10 V) and no change was observed in the display quality even after the driving test at a voltage of 25 V for a period of 200 hours.

As comparative examples, liquid crystal display devices were produced in the same way as in the display device of the present invention except that 1.5 wt% each of the ionic substances, i.e., (1) p-anisaldehyde, (2) p-aminophenol and (3) p-n-butylaniline (not the hexadecylpyridinium salts) of the following structural formulas were added to form liquid crystal mixtures:

(1) OCH₃-C₆H₄-CHO   (2) OH-C₆H₄-NH₂   (3) C₄H₉-C₆H₄-NH₂

After the driving test at a voltage of 15 V for a period of 200 hours, degradation of the display contrast was observed in each of these display devices. In other words, they were colored even without the application of any voltage and their driving voltage was also as high as at least 15 V.

As can be understood from the foregoing description, the use of the liquid crystal mixture in accordance with the present invention can provide a color liquid crystal display device having high display contrast, low driving voltage, long service life and high reliability.

What is claimed is:
1. A liquid crystal mixture comprising a nematic liquid crystal having negative dielectric anisotropy, an optically active cholesteric or chiralnematic liquid crystal, a dichroic dye and a hexadecylpyridinium salt, having the following structural formula,

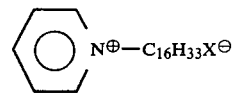

wherein X is a halogen atom.

2. The liquid crystal mixture as defined in claim 1 wherein said nematic liquid crystal is a liquid crystal substance consisting principally of a cyclohexanecarboxylate ester.

3. The liquid crystal mixture as defined in claim 1 wherein X is Br.

* * * * *